(12) United States Patent
Buckley et al.

(10) Patent No.: US 8,438,536 B2
(45) Date of Patent: May 7, 2013

(54) ENCODING SWITCH ON ORDERED UNIVERSES WITH BINARY DECISION DIAGRAMS

(75) Inventors: Alexander R. Buckley, Cupertino, CA (US); Joseph D. Darcy, Mountain View, CA (US)

(73) Assignee: Oracle America, Inc., Redwood City, CA (US)

(*) Notice: Subject to any disclaimer, the term of this patent is extended or adjusted under 35 U.S.C. 154(b) by 861 days.

(21) Appl. No.: 12/607,328

(22) Filed: Oct. 28, 2009

(65) Prior Publication Data

US 2011/0099535 A1    Apr. 28, 2011

(51) Int. Cl.
*G06F 9/44*    (2006.01)

(52) U.S. Cl.
USPC ............................ 717/114; 717/151

(58) Field of Classification Search .................. None
See application file for complete search history.

(56) References Cited

U.S. PATENT DOCUMENTS

| | | | | |
|---|---|---|---|---|
| 5,339,420 | A | * | 8/1994 | Hoxey ............................ 717/151 |
| 5,493,054 | A | * | 2/1996 | Forat et al. .................... 562/861 |
| 6,076,141 | A | | 6/2000 | Tremblay et al. |
| 6,775,763 | B2 | | 8/2004 | Sexton et al. |
| 7,086,039 | B2 | * | 8/2006 | Lam .............................. 717/136 |
| 7,430,548 | B2 | * | 9/2008 | Huelsman et al. .............. 706/47 |
| 2006/0129956 | A1 | * | 6/2006 | Ward ................................ 716/4 |
| 2011/0055545 | A1 | * | 3/2011 | Sovio et al. ................... 713/150 |

OTHER PUBLICATIONS

Knuth, Donald E., "A Draft of Section 7.1.4: Binary Decision Diagrams" The Art of Computer Programming, vol. 4, Pre-Fascicle 1B, Addison-Wesley, Dec. 22, 2008.

* cited by examiner

*Primary Examiner* — Elias Mamo
(74) *Attorney, Agent, or Firm* — Marsh Fischmann & Breyfogle, LLP; Daniel J. Sherwinter

(57) ABSTRACT

Various embodiments herein include one or more of systems, methods, software, and/or data structures to implement a multi-way branch statement in a computer programming language. The multi-way branch statement may include a plurality of case labels each having a non-primitive data type (e.g., strings) and being associated with a block of code to be executed dependent upon a control variable that also has a non-primitive data type. The implementation may include encoding the case labels for the multi-way branch statement as a binary decision diagram (BDD), such as a zero-suppressed binary decision diagram (ZDD), wherein the control variable for the multi-way branch statement may be compared with the case labels by stepping through the BDD. The BDD may include identifiers that provide information regarding which of the case labels is matched by the control variable, such that an appropriate code block may be executed.

18 Claims, 8 Drawing Sheets

$$F = \begin{cases} \{a_1 \ l_2 \ a_3 \ b_4 \ a_5 \ m_6 \ a_7 \ \$_8\}, & \text{—204} \\ \{a_1 \ l_2 \ a_3 \ s_4 \ k_5 \ a_6 \ \$_7\}, & \text{—206} \\ \{a_1 \ r_2 \ i_3 \ z_4 \ o_5 \ n_6 \ a_7 \ \$_8\}, & \text{—208} \\ \{a_1 \ r_2 \ k_3 \ a_4 \ n_5 \ s_6 \ a_7 \ s_8 \ \$_9\} & \text{—210} \end{cases}$$

FIG.2

$$U = \begin{Bmatrix} a_1 & l_2 & r_2 & a_3 & i_3 & k_3 & a_4 & b_4 & s_4 \\ z_4 & a_5 & k_5 & n_5 & o_5 & a_6 & m_6 & n_6 & s_6 \\ a_7 & \$_7 & s_8 & \$_8 & \$_9 & & & & \end{Bmatrix}$$

FIG.3

ENCODING SWITCH ON ORDERED UNIVERSES WITH BINARY DECISION DIAGRAMS

BACKGROUND

Many computer programming languages include a language construct that may be viewed as a multi-way branch, in which the value of a run-time variable or expression may be compared with members of a set of constants, and a branch selection is made based on the result of the comparisons. Such constructs are often known as "switch statements."

The run-time variable or expression, sometimes referred to as the "control variable" or "input control variable," may be tested, against a set of case labels (or "case values"). If the value of the control variable matches a case label, the program will execute a block of code associated with that case label. If the value of the control variable does not match that case label, the next case label may be examined and the process repeats until a match is found or until the given set of case labels is exhausted. In some languages, a "default" case label may be used to handle situations where the control variable does not match any of the case labels. Further, the method of terminating a block of code associated with a case label may vary by programming languages. Typically, a "break" keyword is used to signal the end of a block. When encountered, the "break" keyword causes the program execution to exit the multi-branch construct. If no "break" keyword is present at the end of a block of code, in many languages the program execution "falls through" to the code associated with the next case label in the construct, as if its value also matched the control variable. In other languages, "fall throughs" are not permitted and a "break" keyword is implicit and does not need to appear in the source code.

One example programming language that includes the aforementioned multi-way branches is the Java programming language. The keyword used in Java for this type of function is "switch." To provide a context for the features presented herein, an example of the use of the "switch" statement available in the Java programming language is described below.

A Java switch statement works with data types including the byte, short, char, and int primitive data types. The switch statement also works with enumerated types and a few special classes that "wrap" certain primitive types. The following example program declares an integer variable named "month" whose value represents a month of the year. The program assigns the name of the month to a string variable "str" based on the value of the integer variable "month", using a switch statement as follows:

```
int month = 8;
String str;
switch (month) {
    case 1: str = "January"; break;
    case 2: str = "February"; break;
    case 3: str = "March"; break;
    case 4: str = "April"; break;
    case 5: str = "May"; break;
    case 6: str = "June"; break;
    case 7: str = "July"; break;
    case 8: str = "August"; break;
    case 9: str = "September"; break;
    case 10: str = "October"; break;
    case 11: str = "November"; break;
    case 12: str = "December"; break;
    default: str = "Invalid month.";break;
}
```

In this case, the variable str is set to "August" since the integer "month" is set to equal 8.

The switch statement above could also be implemented with if-then-else statements:

```
int month = 8;
String str;
if (month == 1) {
    str = "January";
} else if (month == 2) {
    str = "February";
}
... // and so on
```

Deciding whether to use if-then-else statements or a switch statement may be based on several factors, including readability, compile time requirements, execution time requirements, memory requirements, or other factors. It is noted that if-then-else statements and switch statements may be expressed in terms of one another. Generally, the if-then-else construct is more powerful since it may be used to compare multiple variables at once and compare a variable against a range of values. However, a switch construct is more readable when only one variable is being compared against a restricted set of values.

As noted above, the break statements are used because without them, case statements fall through. That is, without an explicit break, control of the program will flow sequentially through subsequent case statements. The following program illustrates why it might be useful to have case statements fall through:

```
int month = 2;
int year = 2000;
int numDays = 0;
switch (month) {
    case 1:
    case 3:
    case 5:
    case 7:
    case 8:
    case 10:
    case 12:
        numDays = 31;
        break;
    case 4:
    case 6:
    case 9:
    case 11:
        numDays = 30;
        break;
    case 2:
        numDays = ((year % 4 == 0) && !(year % 100 == 0)) || (year %400 == 0)) ? 29 : 28;
        break;
    default:
        numDays = -1;
        break;
}
```

In this example, since the integer variable "month" is set to 2 and the integer variable "year" is set to 2000, the variable numDays is assigned to 29.

If the range of case labels is relatively small and has only a few gaps (i.e., the case labels form a dense set), compilers may implement the switch statement as a branch table or an array of indexed function pointers rather than a lengthy series of conditional instructions. As can be appreciated, using such methods for case labels that form a sparse set could result in relatively inefficient programs.

SUMMARY

Various embodiments herein include one or more of systems, methods, software, and/or data structures to implement a multi-way branch statement (or "switch statement") in a computer programming language. The multi-way branch statement may include a plurality of case labels each having a non-primitive or "rich" data type (e.g., strings, arrays, integer types larger than primitive integers, and the like) and associated with a block of code to be executed dependent upon a control variable that also has a rich data type. The implementation may include encoding the case labels for the multi-way branch statement as a binary decision diagram (BDD), such as a zero-suppressed binary decision diagram (ZDD), such that the control variable for the multi-way branch statement may be compared with the case labels by stepping through the BDD. Additionally, to identify which of the case labels is matched with the control variable, the BDD may include identifiers that provide information regarding which (if any) of the case labels is matched by the control variable, such that an appropriate code block may be executed.

According to a first aspect, a computer-implemented method for providing a multi-way branch statement is provided. The multi-way branch statement may have a plurality of case labels each having a non-primitive (or "rich") data type and being associated with a code block. The method may include encoding the case labels as a binary decision diagram (BDD) created from a family of sets. Each set in the family may include elements which correspond to characters of one of the plurality of case labels, and the BDD may include a plurality of nodes that correspond to the elements of sets in the family. The method may also include generating one or more identifiers for each unique code block associated with one or more case labels in the multi-way branch statement. Further, each identifier may be associated with a path of the BDD that exclusively encodes case labels associated with the unique code block identified by the identifier. Additionally, the method may include storing the BDD and the identifiers in a data storage.

According to a second aspect, a computer system for implementing a multi-way branch statement is provided. The multi-way branch statement may have a plurality of case labels each having a non-primitive data type and being associated with a code block. The computer system may include a processor and a data storage coupled to the processor. Further, the data storage may store a multi-way branch statement implementation module that is operative to be executed by the processor to encode the case labels as a binary decision diagram (BDD) created from a family of sets, each, set in the family including elements which correspond to characters of one of the plurality of case labels. The BDD may include a plurality of nodes that correspond to the elements of sets in the family. The multi-way branch statement implementation module may also be operative to be executed by the processor to generate one or more identifiers for each unique code block associated with one or more case labels in the multi-way branch statement. Additionally, each identifier may be associated with a path of the BDD that exclusively encodes case labels associated with the unique code block identified by the identifier.

According to a third aspect, a computer readable medium for implementing a multi-way branch statement is provided. The multi-way branch statement may have a plurality of case labels each having a non-primitive data type and being associated with a code block. The computer readable medium may include instructions which when processed by a computer, cause the computer to encode the case labels as a binary decision diagram (BDD) created from a family of sets. Each set in the family may include elements which correspond to characters of one of the plurality of case labels. Further, the BDD may include a plurality of nodes that correspond to the elements of, sets in the family. The computer readable medium may also include instructions which when processed by a computer, cause the computer to generate one or more identifiers for each unique code block associated with one or more case labels in the multi-way branch statement. Each identifier may be associated with a path of the BDD that exclusively encodes case labels associated with the unique code block identified by the identifier. Additionally, the computer readable medium may include instructions which when processed by a computer, cause the computer to store the BDD and the identifiers in a data storage.

In addition to the exemplary aspects and embodiments described above, further aspects and embodiments will become apparent by reference to the drawings and by study of the following descriptions.

BRIEF DESCRIPTION OF THE DRAWINGS

FIG. 2 illustrates a family of sets that may be used to form a binary decision diagram (BDD) for the case labels of the multi-way branch statement shown in FIG. 1.

FIG. 3 illustrates a universe of elements that may be used to form a binary decision diagram (BDD) for the case labels of the multi-way branch statement shown in FIG. 1.

DETAILED DESCRIPTION

Switching (or branching) program flow dependent on the run-time value of a control variable or expression is a useful, general-purpose operation found in many programming languages. It may be more compact than a series of conditional statements (e.g., if... then... else... else... end if) and easier to read. For improved memory and execution optimization, multi-way branch statements (or "switch statements") are often compiled by a compiler to special-purpose machine instructions (or virtual machine instructions) that are based on table looks ups. For case labels of a switch statement that form a relatively dense set (e.g., a set of consecutive or similar integers), table look up operations are relatively fast and utilize a relatively small amount of memory. However, as can be appreciated, case labels that are of a non-primitive data type such as strings (or hash values thereof) form relatively sparse, sets. That is, the values of the non-primitive data type case labels actually used are relatively small compared to the possible values for the case labels. As an example, a particular switch statement may include tens or hundreds of unique case labels out of the millions or even billions of case labels that are possible. For this and other reasons, many computer programming languages do not permit case labels having a non-primitive data type in switch statements, even though this feature would be desirable in many applications.

To provide functionality for implementing switch statements that permit non-primitive data types as case labels, present embodiments described herein advantageously encode the case labels for switch statements as a binary decision diagram (BDD), such as a zero-suppressed binary decision diagram (ZDD), wherein an input control variable for the switch statements may be compared with the case labels by stepping through the BDD. Additionally, to identify which of the case labels is matched with the control variable, the BDD may include labels (or identifiers) that provide information regarding which (if any) of the case labels is matched by the control variable, such that an appropriate code block may be executed. Using a BDD data structure to encode case labels having a non-primitive data type may allow for efficient switching on non-primitive data types by significantly reducing the computation required at run-time. In particular, using BDD data structures may require only a single pass for an input control variable being switched on at run-time. Further, using a BDD data structure may further improve run-time performance by permitting speculative execution of case target code based on partial matches of a control variable with a case label. The particulars of the features present herein are described in further detail below.

Figure 1:
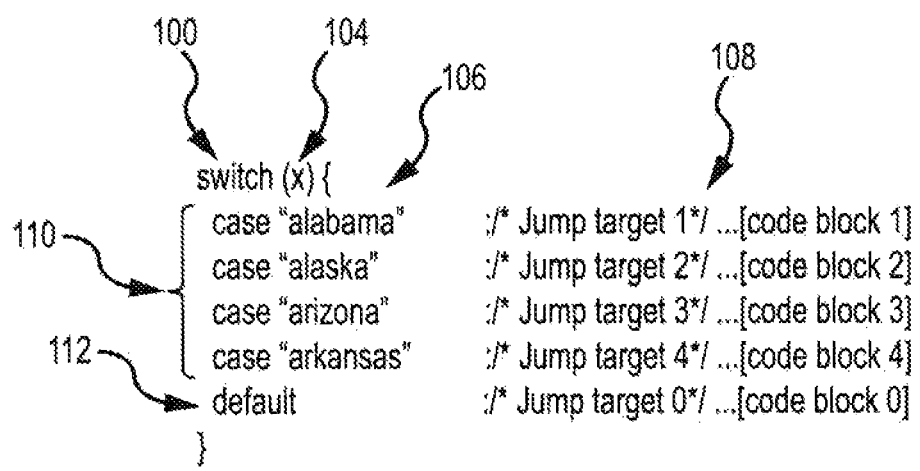
FIG. 1 illustrates an exemplary multi-way branch statement that includes string case labels.

FIG. 1 illustrates an exemplary switch statement 100 that permits string case labels. These types of switch statements may generally be referred to herein as "string switch statements." Although the switch statement 100 is written in a format for the Java programming language, it should be appreciated that this format is provided as an example and that other programming languages may be used as well. Further, as noted above, the systems and methods described herein may be used with non-primitive data types other than strings. Such other non-primitive, data types may include lists, records, arrays, integer types larger than primitive integers, custom data types, and others. Generally, the features presented herein may be used with any data type for which an invertible function may be created between values in the data type and strings.

In the example shown in FIG. 1, the switch statement 100 includes four "case" keywords 110 followed by four string case labels 106 (i.e., "alabama," "alaska," "arizona," and "arkansas"). Next to each case label 106 is a code block 108 (i.e., code blocks 0-4) that, represents computer program code that is to be executed when a control variable 104 matches its associated case label 106. For example, during run-time, if a string control variable 104 is determined to be equal to the case label "arizona," the code block 3 will be executed. The comments shown in FIG. 1 illustrate that each of the case labels 106 may be associated with a particular jump target 0-4 (or address or other identifier) in the program code 108 to be executed when a control variable 104 matches a particular case label 106. The switch statement 100 also includes a "default" keyword 112 that may be used to execute code block 0 when the control variable 104 does not match any of the case labels 106.

Figure 4:
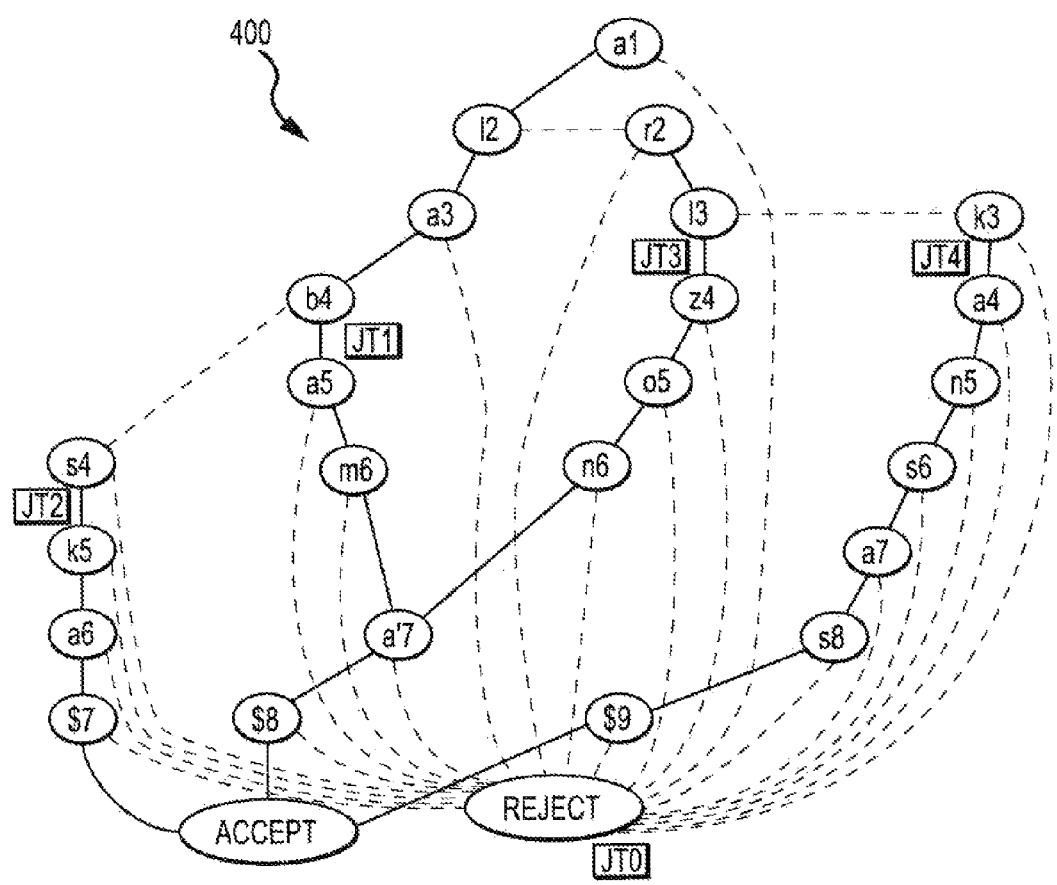
FIG. 4 illustrates an exemplary. BDD that encodes the string case labels for the multi-way branch statement shown in FIG. 1.

FIGS. 2-4 are directed to illustrating a procedure for encoding the case labels 106 of the switch statement 100 shown in FIG. 1 as a binary decision diagram (BDD). Generally, a binary decision diagram (BDD) is a data structure that is used to represent a Boolean function. As used herein, the term "BDD" may encompass BDDs as well as other data structures having similar properties. At a more abstract level, BDDs may be considered as a compressed representation of sets or relations. A BDD represents a Boolean function as a rooted, directed, acyclic graph (DAG) that includes decisions nodes and two terminal or leaf nodes called FALSE and TRUE (or 0-terminal and 1-terminal). Each decision node is labeled by a Boolean variable and has exactly two child nodes which may be referred to as low child and high child. The edge from a decision node to a low child represents an assignment of the variable to 0 and may be referred to as a negative or a LO edge. Similarly, the edge from a decision node to a high child represents an assignment of the variable to 1 and may be referred to as a positive or HI edge. A path from a root node to the 1-terminal represents a variable assignment for which the represented Boolean function is true, whereas a path from a root node to the 0-terminal represents a variable assignment for which the Boolean function is false.

When BDDs are applied to combinatorial problems, it may be observed that most of the positive edges of the decision nodes simply point to the 0-terminal. This may especially be true for matching strings. In these cases, a zero-suppressed binary decision diagram (ZSDD, ZBDD, or ZDD) may perform better than a standard BDD. A ZDD is a type of BDD designed to encode sets of combinations or a family of sets of primitive elements. A ZDD is a rooted, directed, acyclic graph (DAG) that includes terminal and non-terminal nodes. Each of the non-terminal nodes is labeled with a variable and has two outgoing edges to child nodes referred to as a negative edge (or LO edge) and positive edge (or HI edge).

Similar to standard BDDs, ZDDs have two terminal or leaf nodes labeled FALSE and TRUE (or 0-terminal and 1-terminal) which do not have outgoing edges. Further, the universe of all variables (or primitive elements) is ordered, and the order of the variables appearing on the nodes of any path through the ZDD is consistent with the total order. Additionally, each path through the ZDD that ends at the TRUE terminal node defines a set of variables in the family of sets. In general, a set contains a variable if the path passes through a node of the ZDD labeled with the variable and leaves the node along its positive edge. Assuming that the variable ordering is fixed, the smallest ZDD representing a given family of sets is unique and can be determined efficiently using programming techniques.

FIG. 2 illustrates a family (F) 200 of sets 204, 206, 208, 210 created for encoding the case labels 106 shown in FIG. 1 into a BDD data structure. Each set 204, 206, 208, 210 represents characters for one of the case labels 106. For example, the set 204 includes the elements $a_1$, $l_2$, $a_3$, $b_4$, $a_5$, $m_6$, $a_7$, which correspond to the case label "alabama." Note that the elements also include a subscript number to identify their ordinal position in the case label (e.g., $b_4$ indicates that the letter b is the fourth letter in the case label "alabama"). Each set 204, 206, 208, 210 also includes a sentinel character (i.e., $\$_8$, $\$_7$, $\$_8$, $\$_9$) appended after the element representing the last character in each associated case label 106. As described in more detail below, the sentinel characters are used to ensure that an input control variable 104 is not matched with a case label 106 if the control variable 104 is a superset of the case label 106 (e.g., the sentinel character ensures that "arizonas" is not matched with "arizona").

FIG. 3 illustrates a universe (U) 300 that is formed from the characters appearing in the case labels 106 for the switch statement 100 shown in FIG. 1. As can be appreciated, the elements in the universe (U) 300 may be used to create the family (F) 200 shown in FIG. 2.

FIG. 4 illustrates a graphical representation of a BDD 400 data structure that encodes the family (F) 200 of sets 204, 206, 208, 210 shown in FIG. 2, which correspond to the case labels 106 for the switch statement 100 shown in FIG. 1. The BDD 400 includes a root node $a_1$, which corresponds to the lowest value in the family (F) 200. In this example, the "value" of an element is given first by its ordinal position and then alphabetically. For example, $z_4$ is smaller than $o_5$, and $a_3$ is smaller than $k_3$. The positive edges of each decision node are represented by solid lines, whereas the negative edges of each decision node are represented by dashed lines. In practice, the BDD 400 may be constructed from the root node $a_1$ downward using recursive procedures.

As can be seen in FIG. 4, the path for each of the sets 204, 206, 208, 210 is encoded into the BDD 400 such that a set of elements compared (or "joined") against the BDD 400 having the identical elements as one of the sets 204, 206, 208, 210 will travel a path of the BDD 400 that ends at the ACCEPT (or TRUE) node. Sets of elements compared (or "joined") against the BDD 400 having elements different from all of the sets 204, 206, 208, 210 will travel a path of the BDD 400 that ends at the REJECT (or FALSE) node. In this regard, an input control variable 104 may be compared with the case labels 106 using the BDD 400 to determine whether there is a match.

It is noted that the $a'_7$ decision node in the BDD 400 is a child of two decision nodes (i.e., $m_6$ and $n_6$). That is, the $a_7$ node for the "arizona" case label and the $a_7$ node for the "alabama" case label have been combined into the $a'_7$ node. This is possible because the two nodes would be identical (same label, same LOW child node, and the same HI child node) if they were implemented separately in the BDD 400. Further, the $a'_7$ decision node is used in addition to an $a_7$ decision node to differentiate between the two case labels that end with "a" as the seventh letter (i.e., "alabama", "arizona") and the case label that has an "a" as the seventh letter followed by another letter (i.e., "arkansas"). Further, as noted above, the sentinel character nodes $\$_7$, $\$_8$, and $\$_9$ are used to encode the end of string condition for each case label 106, so that a string control variable 104 is not matched with a case label 106 if the string control variable 104 is a superset of one of the case labels 106 (e.g., "arizona state" is not matched with "arizona").

To provide this functionality, a sentinel character is also added to the end of the input string control variable 104 that is compared with the BDD 400. It is noted that the sentinel characters need only be "logically" present. In other words, the sentinel characters are used to represent "end of input" in the system. In this regard, the "$" symbol is meant to represent a value outside of the set of legal characters in a string. In other embodiments, the test for the presence of a "$" could include determining the length of a string, rather than checking for an actual "end of line" character.

As noted above, the BDD 400 may be used to determine whether an input control variable 104 matches one of the case labels 106 associated with the string statement 100. In this regard, joining a control variable 104 against the BDD 400 may return an ACCEPT or REJECT, depending on whether there is a match. However, it is not enough to determine simply whether there is a match with any of the case labels 106. Rather, to implement a switch statement, it should be determined specifically which case label 106 (or at least which block of code associated with a matched case label) has been matched. To accomplish this, the BDD 400 may include a plurality of jump targets JT0-4 (or identifiers) located at points on the BDD that represent an exclusive match to a code block associated with a particular case label 106.

As shown, the jump targets JT0-4 are associated with positive edges of decision nodes that represent an exclusive match against a set in the family (F) 200, which indicates a possible match with one of the case labels 106. For example, the jump target JT1 is positioned at the positive edge of the decision node $b_4$, because that location on the BDD 400 indicates that a control variable 104, if it is match for any case label 106, will have to be a match for the case label "alabama." To ensure that a particular control variable 104 is a complete match and not simply a partial match (e.g., "alabamas" or "alaba"), the remainder of the control variable string should normally be matched against the BDD 400 until the ACCEPT or REJECT node is reached. Similarly, the jump target JT2 is positioned at the positive edge of $s_4$ (i.e., representing a possible exclusive match for "alaska"), the jump target JT3 is positioned at the positive edge of $i_3$ (i.e., representing a possible exclusive match for "arizona"), and the jump target JT4 is positioned at the positive edge of $k_3$ (i.e., representing a possible exclusive match for "arkansas"). Further, the jump target JT0 may be associated with the REJECT node, such that the code block associated with the "default" keyword of the switch statement 100 will be executed for all control variables that do not match any of the case labels 106.

The jump targets JT0-4 may generally include labels that identify which block of code is to be executed by a program executing the switch statement 100. For example, the jump targets JT0-4 may be associated with an address of a code block associated with a particular case label 106. It should be appreciated that the jump targets JT0-4 may be implemented in several ways so long as they identify which block of code is to be executed in the event that an input control variable 104 matches a case label 106.

In some embodiments, the BDD 400 may be generated at run-time when the switch statement 100 is being executed. In other embodiments, the BDD 400 including the jump targets JT0-4 may be generated at compile-time by a compiler and stored in memory. In these embodiments, the run-time code executing the switch statement 100 may include a function that matches an input control variable 104 against the BDD 400 and returns one of the jump targets JT0-4 dependent upon the result of the match operation.

Since it is determined which case labels (and therefore which code blocks) are potential matches prior to fully determining whether there is an actual match, an aggressive compiler may initiate execution of a code block prior to fully determining whether a case label was matched. For example, a compiler may cause a program to initiate the execution of code block 1 when the first two characters of an input control variable 104 are "al," which corresponds to the jump target JT1. Then, if the final result of the comparison is not a match, the result of executing the code block can be discarded. As can be appreciated, the run-time performance of an application may be improved by speculatively executing a code block based on partial matches.

Figure 5:
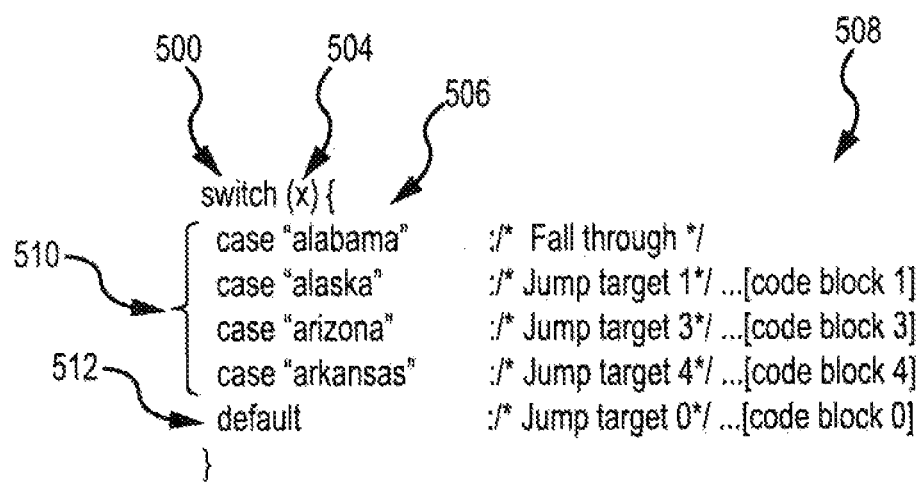
FIG. 5 illustrates another exemplary multi-way branch statement that includes string case labels.

FIG. 5 illustrates another switch statement 500 similar to the switch statement 100 shown in FIG. 1. The switch statement 500 includes a string control variable 504, four "case" keywords 510 and associated case labels 506, a "default" keyword 512, and code blocks 508. In this example, the jump target 1 that identifies code block 1 is associated with two case labels 506, namely "alabama" and "alaska." In other words, the switch statement 500 is configured such that code block 1 is to be executed when the input control variable 504 matches either of the case labels "alabama" and "alaska."

Figure 6:
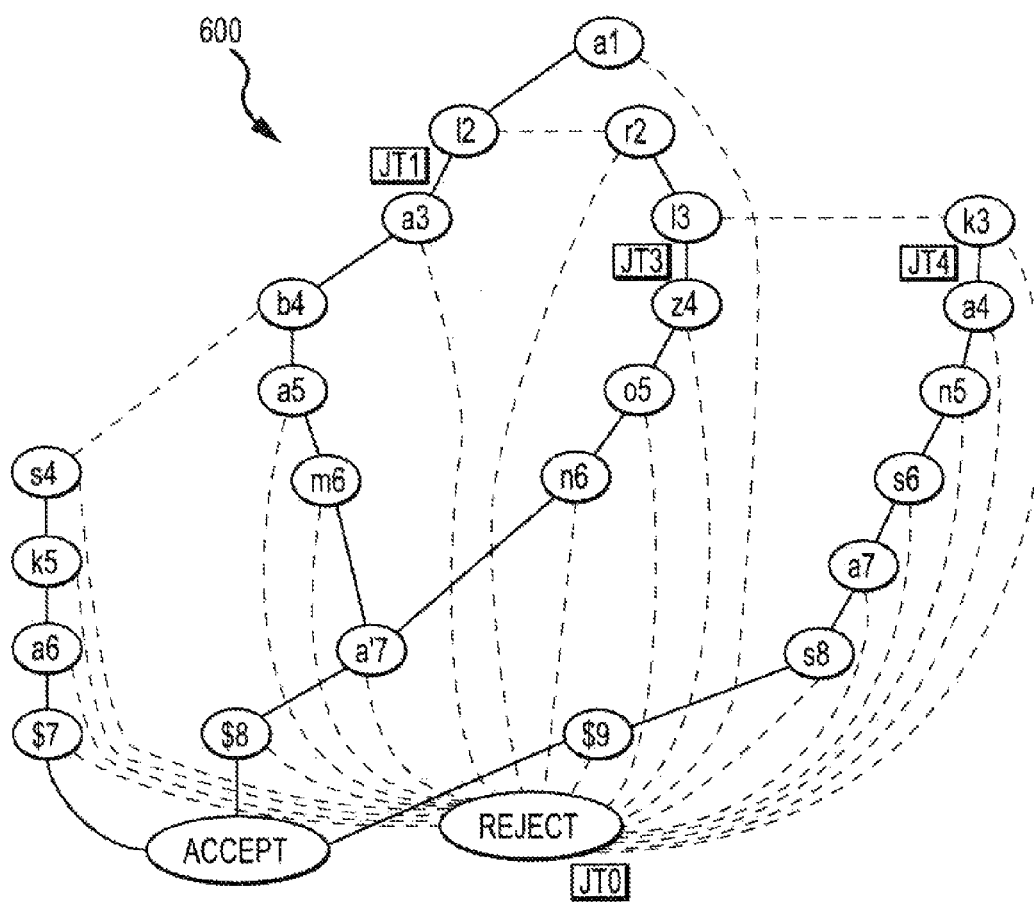
FIG. 6 illustrates an exemplary BDD that encodes the string case labels for the multi-way branch statement shown in FIG. 5.

FIG. 6 illustrates a BDD 600 which encodes the switch statement 500 shown in FIG. 5. The BDD 600 is similar to the BDD 400 shown in FIG. 4, except that the jump target JT1 is positioned at the positive edge of the decision node $l_2$ rather than decision node $b_4$, and there is no jump target JT2. As can be appreciated, since the case labels "alabama" and "alaska" are both associated with the same code block (i.e., code block 1 shown in FIG. 5), the jump target JT1 may be positioned at the positive edge of the decision node $I_2$, since that is the earliest point where it is known that, if the control variable 104 matches one of the case labels 506, it must match a case label 506 that is associated with code block 1.

It should be appreciated that other switch flow-control configurations are also contemplated. For example, the following switch statement may be implemented using the features presented herein:

```
switch(x) {
case "alabama":
// execute code for alabama
// then fall through...
case "alaska":
// execute code for alasksa, and possibility for alabama if alabama was matched
break;
...
} // end switch
```

In this example, there is no "break" keyword after the code that is to be executed when an input control variable matches "alabama." In this case, when "alabama" is matched, the code for "alabama" and "alaska" is executed before exiting the switch statement. Those skilled in the art will readily recognize that this and other various switch flow-control configurations may be implemented using the techniques presented herein.

Figure 7:
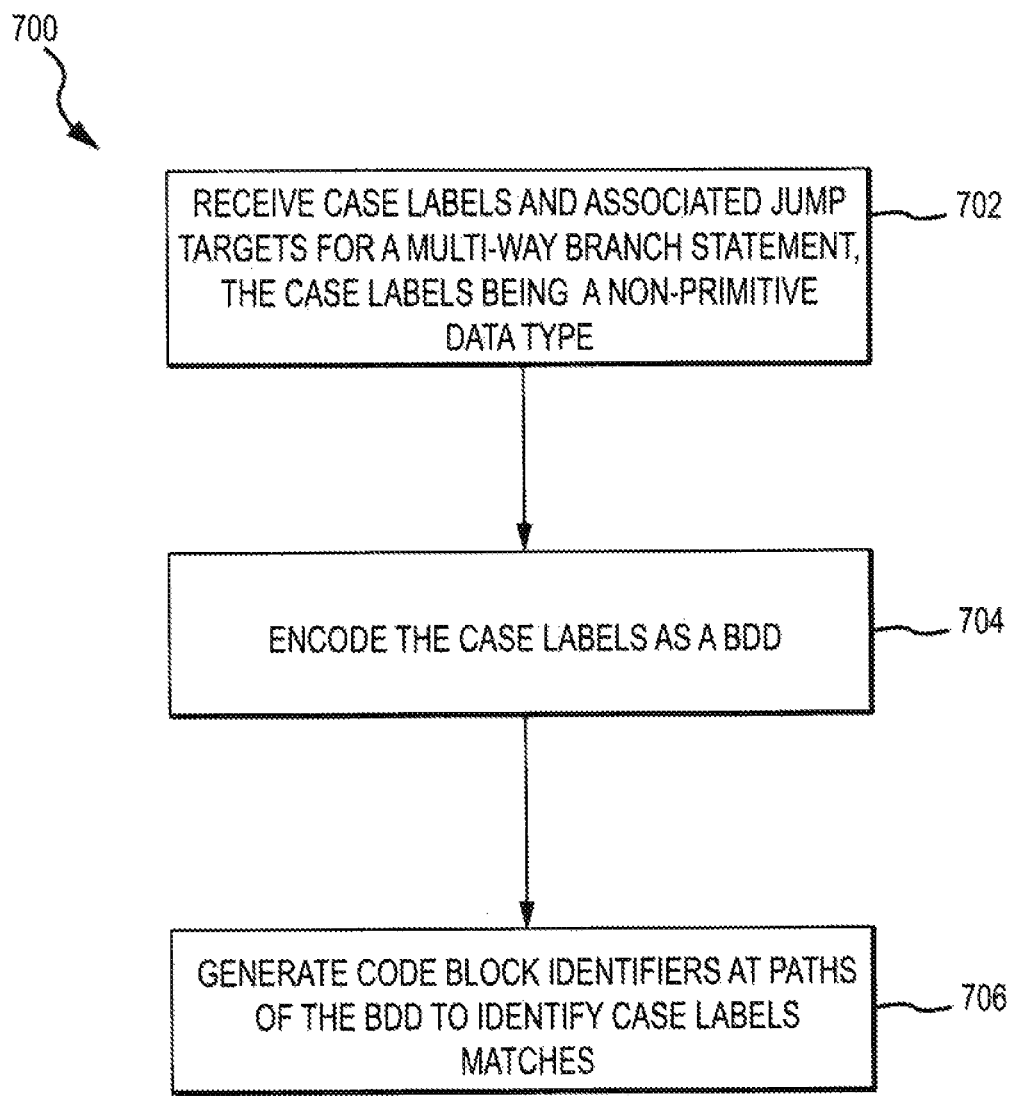
FIG. 7 illustrates a process for encoding string case labels of a multi-way branch statement as a BDD.

FIG. 7 illustrates a process 700 for encoding a switch statement as a BDD. The process 700 may be implemented by modules (e.g., a compiler) executing on a computer system, such as the computer system 910 shown in FIG. 9 and described below. The process 700 may begin by receiving case labels having a non-primitive data type (e.g., string case labels 106 and 506 shown in FIGS. 1 and 5, respectively) and associated jump targets (or identifiers) for a multi-way branch statement (step 702). Next, the process 700 includes encoding the case labels for the multi-way branch statement as a BDD according to the procedures described above with reference to FIGS. 1-6 (step 704). Further, the process 706 includes generating identifiers at paths of the BDD to identify matches for the case labels (step 706). Similar to the examples described above, the identifiers may be associated with positive edges of decision nodes on the BDD which indicate a possible exclusive match for a case label or a block of code associated with one or more case labels.

Figure 8:
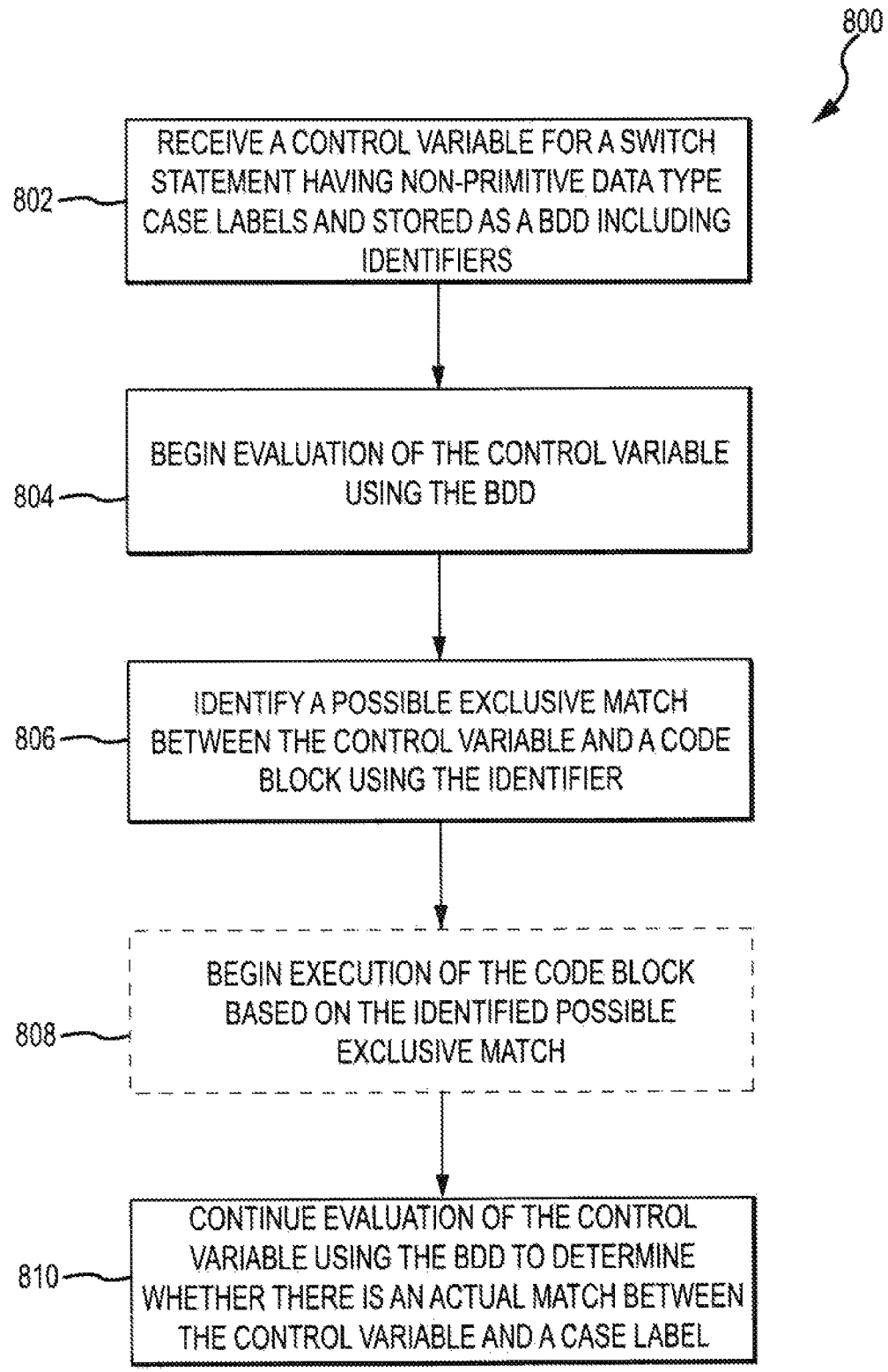
FIG. 8 illustrates a process for executing a function that matches a control variable with string case labels of a multi-way branch statement that is encoded as a BDD.

FIG. 8 illustrates a process 800 for executing a multi-way branch statement using a BDD data structure, such as the BDD data structures 400 and 600 shown in FIGS. 4 and 6, respectively. The process 800 may be implemented on a computer system executing program code that includes the branch statement. For example, the process 800 may be implemented on the computer system 910 shown in FIG. 9, or on another suitable computer system. The process 800 begins by receiving a control variable for a multi-way branch statement that has non-primitive data type case labels and is stored as a BDD including identifiers similar to the embodiments described above (step 802). As an example, the BDD and identifiers may have been previously generated by a compiler and stored in memory as an appropriate data structure. The process 800 further includes beginning an evaluation (i.e., matching or "joining") of the control variable against the BDD to determine whether the control variable matches any of the case labels of the switch statement (step 804). The process 800 further includes identifying a possible exclusive match between the control variable and a code block using the identifiers (step 806). For example, the process 800 may include stepping through the BDD until one of the identifiers is reached, which indicates that, if the control variable is a match with a case label at all, a specific code block will be executed.

In some embodiments, the process 800 may include beginning execution of the code block identified by the possible match (step 808). As noted above, this is possible because the Identifier indicates that if the control variable matches any case label, a specific code block identified by the identifier will be executed. The process 800 further includes continuing to evaluate the control variable by stepping through the BDD to determine whether there is an actual match between the control variable and a case label (step 810). As noted above, in the case where the code block is speculatively executed based on a partial exclusive match and it is determined that there is no actual match, the resulted from the speculative execution of the code block may be discard.

It should be appreciated that the features described herein are not limited to multi-way branch statements that have string case labels. Rather, a family of sets may be formed for any case labels provided the case labels are of a data type for which an invertible function can be created between values in the data type and strings. In simple cases, the case labels may first be converted to strings to allow the exemplary embodiment described above to be used. For example, a multi-way branch statement that has integer case labels 1, 10, and 200 may encode strings as "1", "10", and "200". Generally, encoding case labels as a BDD or ZDD may provide several advantages including the ability to efficiently implement switch statements using rich data types by utilizing identifiers, speculative execution of case target code based on partial matches of case labels, and other advantages.

Figure 9:
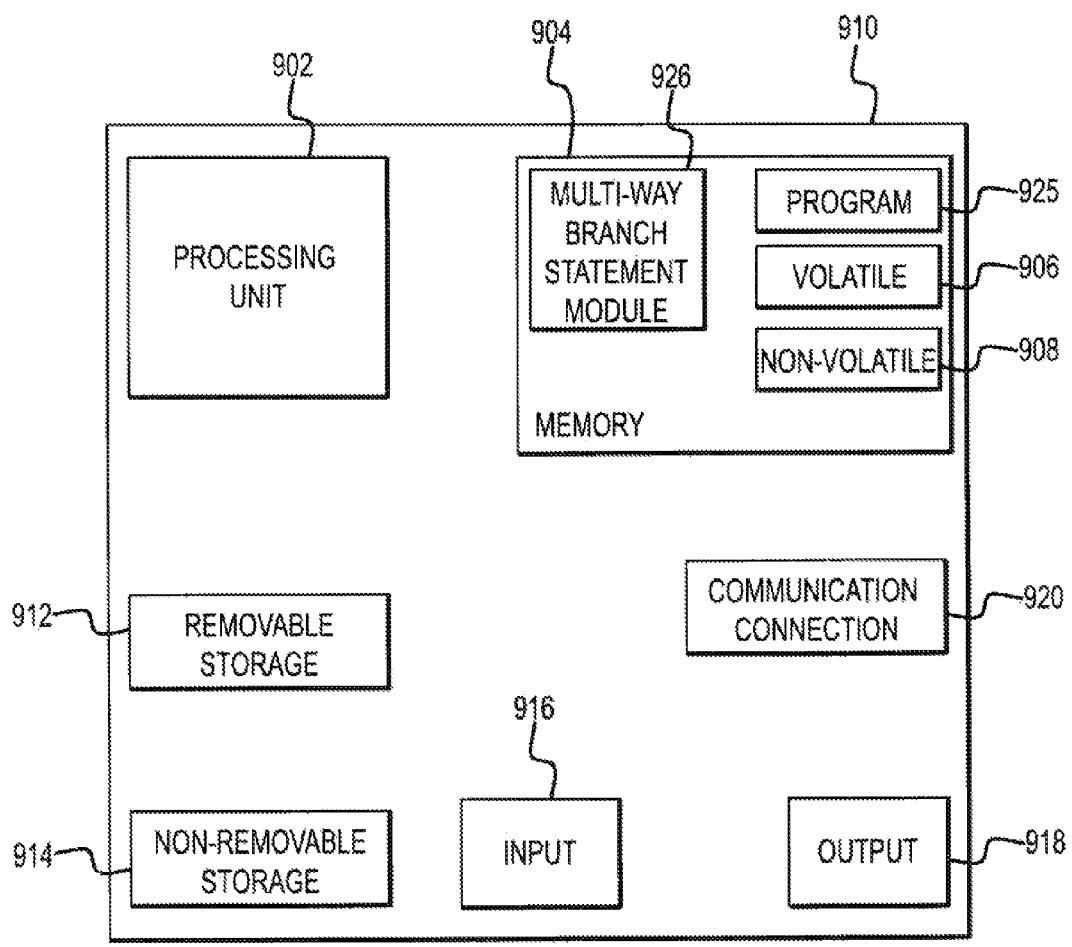
FIG. 9 illustrates a block diagram of an exemplary computer system according to one embodiment.

FIG. 9 is a block diagram of a computer system 910 that may be used to implement the various systems and methods described above. The example computer system 910 in the form of a computer may include a processing unit 902, memory 904, removable storage 912, and non-removable storage 914. Memory 904 may include volatile memory 906 and non-volatile memory 908. The computer system 910 may include, or have access to a computing environment that includes, a variety of computer-readable media, such as volatile memory 906 and non-volatile memory 908, removable storage 912 and non-removable storage 914. Computer storage may include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The computer system 910 may include, or have access to a computing environment that includes, input 916, output 918, and a communication connection 920. The input 916 may include one or mom input devices such as a mouse, a keyboard, electronic pen type input, an audio input device such as a microphone coupled to an audio card or other dedicated audio circuit, a web cam, a screen capture program or device, or other input device. The output 918 may include a video monitor, speakers coupled to the audio card or other dedicated: audio circuit, a pruning device, or other output device.

The computer system 910 may operate in a networked environment using the communication connection 920 to connect to one or more remote computers, such as one or more servers or other remote computers. The remote computers may include one or more of a personal computer ("PC"), notebook computer, consumer electronic device (e.g., camera, camcorder, set top box, mobile device, and the like), server, router, network PC, a peer device, or other common network node, and the like. The communication connection 920 may include a Local Area Network ("LAN"), a Wide Area Network ("WAN"), the Internet, a Virtual Private Network ("VPN"), a peer-to-peer network, or other networks.

Computer-readable instructions stored on a computer-readable medium may be executable by the processing unit 902 of the computer system 910. A hard drive, CD-ROM, and RAM are some examples of articles including a computer-readable medium. For example, one or more computer programs (or application) 925 may be stored in the memory 904. The memory 904 may also store a multi-way branch statement implementation module 926 that is operative to perform the functionality described herein above with reference to FIGS. 1-8. For example, the multi-way branch statement implementation module 926 may include a compiler. Further, one or more computer programs 925 may be execute multi-way branch statements that include non-primitive data types as case labels and control variables.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A computer-implemented method for providing a multi-way branch statement having one or more case labels, the method comprising:
   encoding the case labels as a binary decision diagram (BDD) created from a family of sets;
   generating one or more identifiers for each unique code block associated with one or more case labels in the multi-way branch statement, each identifier being associated with a path of the BDD that exclusively encodes case labels associated with the unique code block identified by the identifier;
   storing the BDD and the identifiers in a data storage;
   receiving a control variable having the same data type as the case labels;
   evaluating the control variable by stepping through the BDD to determine if the control variable matches one of the case labels;
   identifying an identifier dependent on the path of the BDD traversed during the evaluation of the control variable; and
   executing a code block dependent upon the identification of the identifier.

2. The method of claim 1, wherein each of the case labels has a string data type.

3. The method of claim 1, wherein each set in the family comprises elements which correspond to characters of one of the plurality of case labels and wherein the BDD includes one or more nodes that correspond to the elements of sets in the family.

4. The method of claim 1, wherein the BDD is a zero-suppressed binary decision diagram (ZDD).

5. The method of claim 1, wherein multiple case labels are associated with a single code block, or wherein a single case label is associated with multiple code blocks.

6. The method of claim 1, wherein the executing step is initiated prior to the completion of the evaluating step.

7. The method of claim 1, wherein each set in the family of sets includes a sentinel character and wherein the BDD includes one or more nodes that correspond to the sentinel characters.

8. A computer system for implementing a multi-way branch statement having one or more case labels each having a non-primitive data type and being associated with a code block, the computer system comprising:
   a processor; and
   a data storage coupled to the processor, the data storage storing a multi-way branch statement implementation module that is operative to be executed by the processor to:
      encode the case labels as a binary decision diagram (BDD) created from a family of sets, each set in the family comprising elements which correspond to characters of one of the case labels, the BDD including one or more nodes that correspond to the elements of sets in the family;
      generate one or more identifiers for each unique code block associated with one or more case labels in the multi-way branch statement, each identifier being associated with a path of the BDD that exclusively encodes case labels associated with the unique code block identified by the identifiers;
      receive a control variable having the same data type as the case labels;
      evaluate the control variable by stepping through the BDD to determine if the control variable matches one of the case labels;
      identify an identifier dependent on the path of the BDD traversed during the evaluation of the control variable; and
      execute a code block dependent upon the identification of the identifier.

9. The system of claim 8, wherein multiple case labels are associated with a single code block.

10. The system of claim 8, wherein the BDD is a zero-suppressed binary decision diagram (ZDD).

11. The system of claim 8, wherein the non-primitive data type is a string data type.

12. The system of claim 8, the multi-way branch statement implementation module is further operative to be executed by the processor to initiate the execute step prior to the completion of the evaluate step.

13. A non-transitory computer readable medium for implementing a multi-way branch statement having one or more case labels each having a non-primitive data type and being associated with a code block, the computer readable medium including instructions which when processed by a computer, cause the computer to:

encode the case labels as a binary decision diagram (BDD) created from a family of sets, each set in the family comprising elements which correspond to characters of one of the case labels, the BDD including one or more nodes that correspond to the elements of sets in the family;

generate one or more identifiers for each unique code block associated with one or more case labels in the multi-way branch statement, each identifier being associated with a path of the BDD that exclusively encodes case labels associated with the unique code block identified by the identifier;

receive a control variable having the same data type as the case labels;

evaluate the control variable by stepping through the BDD to determine if the control variable matches one of the case labels;

identify an identifier dependent on the path of the BDD traversed during the evaluation of the control variable; and execute a code block dependent upon the identification of the identifier.

14. The computer readable medium of claim 13, further including instructions which when processed by a computer, cause the computer to initiate the execute step prior to the completion of the evaluate step.

15. The computer readable medium of claim 13, wherein the BDD is a zero-suppressed binary decision diagram (ZDD).

16. The computer readable medium of claim 13, wherein multiple case labels are associated with a single code block, or wherein a single case label is associated with multiple code blocks.

17. The computer readable medium of claim 13, wherein the instructions comprise a compiler.

18. A computer-implemented method for providing a multi-way branch statement having one or more case labels, the method comprising:

receiving a control variable having a data type;

evaluating the control variable by stepping through a binary decision diagram (BDD) to determine if the control variable matches one of a set of case labels encoded as the BDD and having the same data type as the control variable;

identifying an identifier dependent on the path of the BDD traversed during the evaluation of the control variable, the identifier being one of a set of identifiers each being associated with a path of the BDD that exclusively encodes case labels associated with a unique code block associated with the identifier; and executing the code block associated with the identifier.

* * * * *